May 22, 1934.  W. M. LESHKO  1,959,481
AUTOMOBILE TRAFFIC INDICATOR
Filed June 20, 1933   2 Sheets-Sheet 2
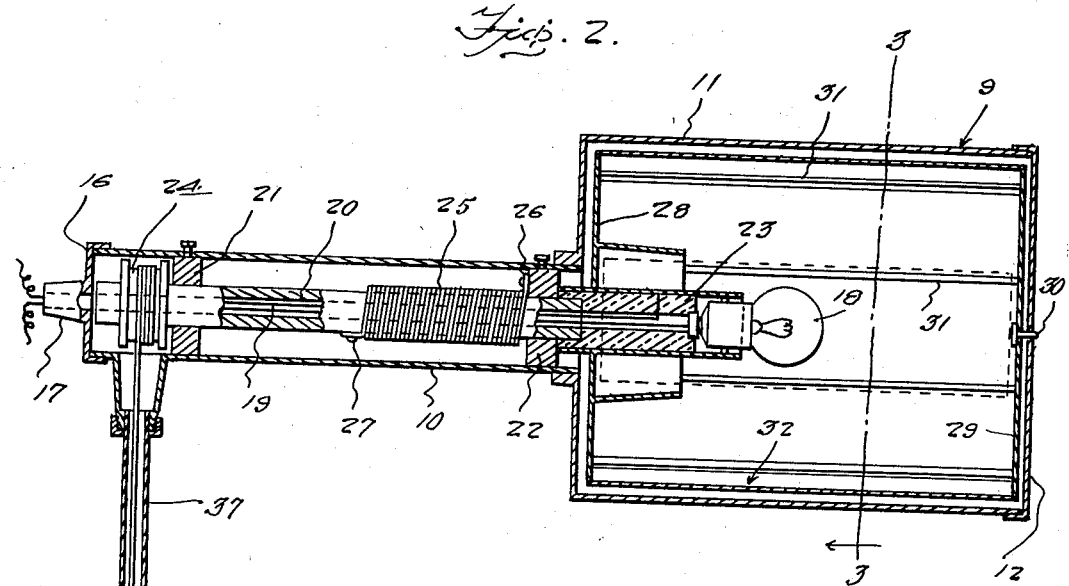
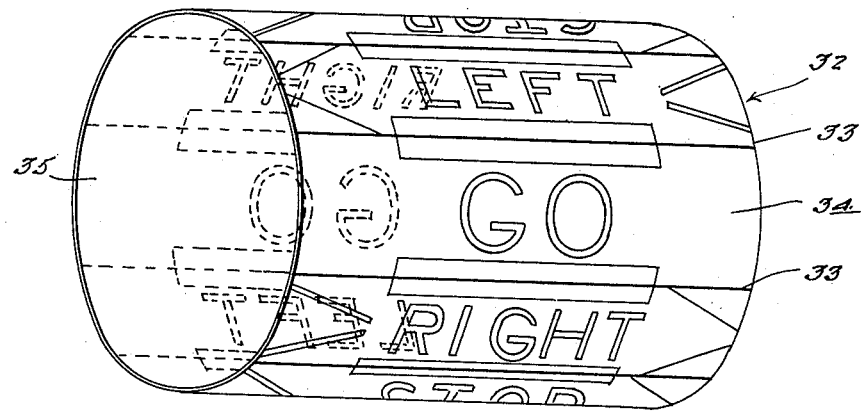
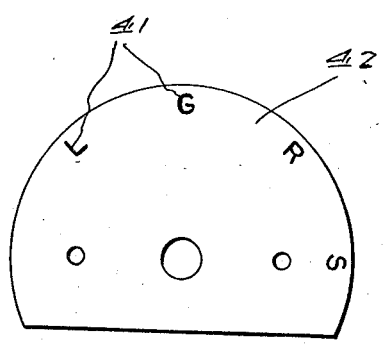
Inventor
W. M. Leshko
By Clarence A. O'Brien
Attorney Patented May 22, 1934

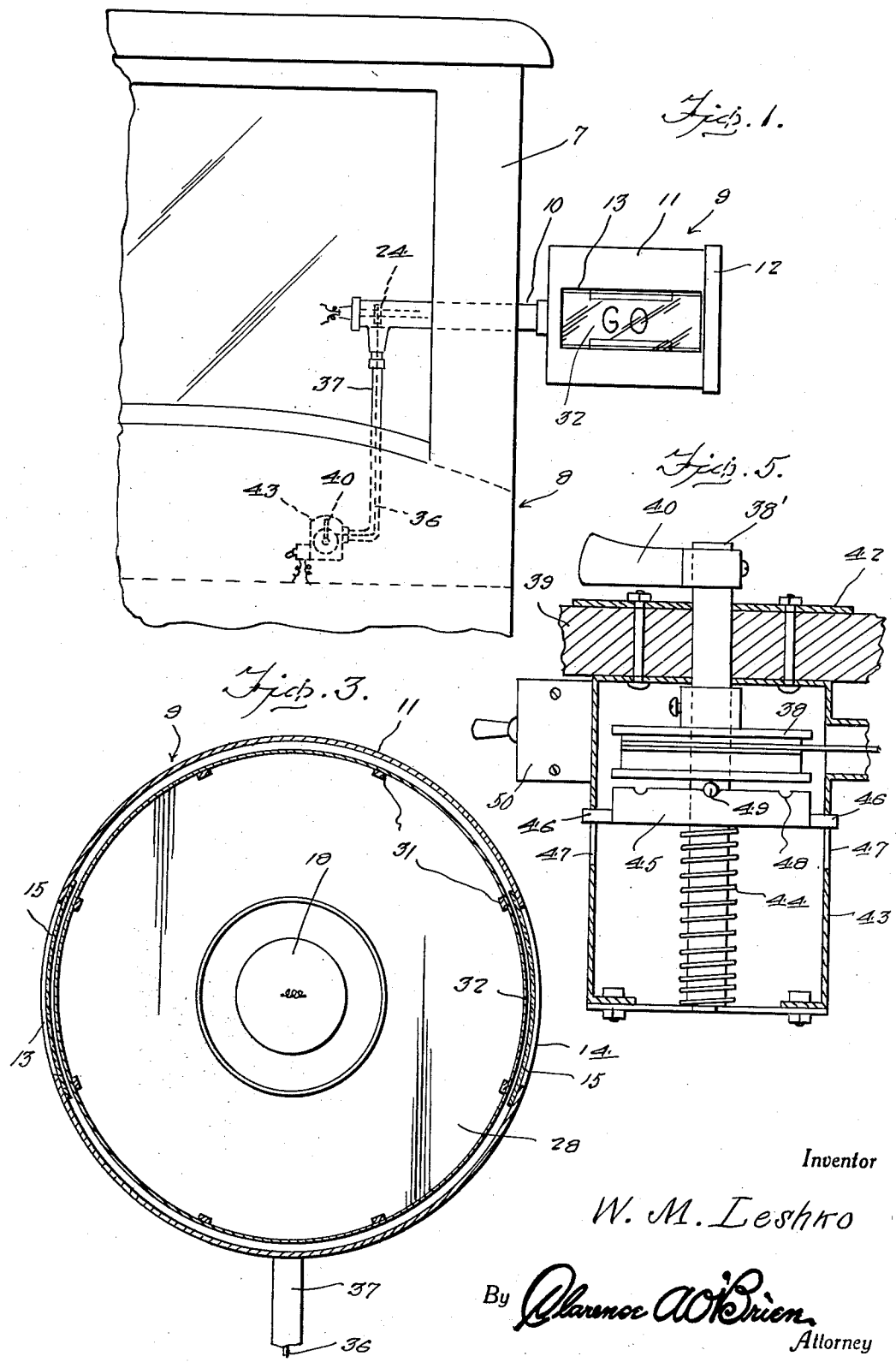

1,959,481

UNITED STATES PATENT OFFICE 1,959,481

AUTOMOBILE TRAFFIC INDICATOR

Wasily M. Leshko, Lykens, Pa.

Application June 20, 1933, Serial No. 676,731

4 Claims. (Cl. 116—44)

This invention relates to the broad class of automotive accessories and appurtenances and has more particular reference to a novel and improved device designed for use in conjunction with present-day automobiles for the purpose of displaying warning directions to facilitate movement of automobiles in traffic.

Being reasonably well conversant with devices of this type now found on the market, as well as previously patented direction indicating signals and the like, I concede without reservation that this particular field of invention is reasonably well developed and characterized by many different styles and varieties of illuminated devices to serve the purpose. In fact, I am aware that it is not new in the prior art to provide a traffic indicator for displaying such signals and warnings as "Go", "Stop", "Left", and "Right".

Notwithstanding the present state of development of the field of invention to which this application relates, I have succeeded in perfecting a differently constructed arrangement which, to my mind, better fulfills the requirements of an invention of this class and which at the same time is in keeping with the requirements of simplicity, economy, and expediency and dependability of operation and use.

Other features and advantages will become more readily apparent from the following description and drawings.

In the drawings:

Figure 1 is a front elevational view of a fragmentary portion of an automobile equipped with a double-acting traffic indicator constructed in accordance with the principles of the present invention.

Figure 2 is a view in section and elevation detailing the specific parts expressly selected and organized to define essential features of the invention.

Figure 3 is a sectional view on the plane of the line 3—3 of Figure 2.

Figure 4 is a perspective view of a transparent indicia or direction display cylinder.

Figure 5 is a view in section and elevation showing the particular construction and arrangement of manually manipulated control means for actuating the directional indicator cylinder.

Figure 6 is a detail view of an index plate or dial.

In accordance with my ideas, the indicator and its mechanism is supported, as a unit, on and of the standards, preferably the left-hand one of the frontal portion of the automobile. In other words, it is mounted on the left-hand side of the automobile near the windshield. Incidently, the automobile in Figure 1, is denoted by the numeral 8 and the indicating device as a unit, is differentiated by the numeral 9.

Referring to Figure 2, the particular construction of this unit or device 9 may well be understood when taken in conjunction with the other views. To begin with, I call attention to a mounting tube 10. This is adapted for horizontal disposition and attachment to the standard 7 so that one end projects into the car and the other end outwardly beyond the car. The latter or outwardly projecting end carries a fixedly mounted cylindrical casing 11 provided at its outer end with a removable cap 12.

This casing, shown in Figures 1 and 3, is provided with diametrically opposed longitudinally elongated slots which function as sight openings. The front sight opening is denoted by the numeral 13 and the rear sight opening by the numeral 14. Both of these sight openings are provided with transparent windows or closures 15. The idea is to provide a sight opening or window which is visible from the front as well as from the rear of the vehicle, thus permitting the device to serve not only for automobile traffic, but for pedestrian indicating means.

At the left-hand end, the mounting tube 10, as shown in Figure 1, is provided with a removable closing cap 16 having a nipple 17 to admit the wires to supply current to the electric bulb 18. The current conductor cable leading to this bulb is distinguished by the numeral 19 and extends through a turnable hollow axle or shaft 20. This shaft is mounted in bearings 21 and 22 rigidly secured in the tubular mounting.

The inner, that is, the right hand end of the axle carries a socket 23 which in turn carries the bulb 18. At the opposite end, the axle is provided with a cable actuated flanged drum 24. The numeral 25 merely designates a return spring, one end of which is anchored as at 26 on the bearing 22, and the opposite end 27 anchored on the axle. This maintains the axle in a predetermined or normal position.

Of particular importance is the rotary indicator carried by the light socket 23 and contained in the protective housing or casing 11. This is a composite unit and comprises a pair of end heads 28 and 29, the head 29 being pivotally supported in the cap 12 as indicated at 30. These heads 28 and 29 are provided with circumferentially spaced attaching bars 31 which together with the heads make up a cylindrical cage to accommodate the transparent display or indicating cylinder 32 shown in Figure 4. This cylinder 32 is preferably made of transparent paper of an appropriate texture. It is divided by circumferentially spaced lines 33 into a plurality of individual opposed pairs of indicating spaces.

The numerals 34 and 35, for example, indicate the order of the spaces. These two spaces, it will be observed, are located in diametrically opposed relationship and each space has printed therein the word "GO". Thus, the idea is that these two indicating spaces 34 and 35 simultaneously register with the sight openings 13 and 14 so that the same signal is visible simultaneously from the front and rear of the device, as before indicated.

The drum 24 is actuated through the instrumentality of a flexible cable 36 which extends through a protective pipe or casing 37. The opposite end of the cable is wound on a somewhat larger flanged drum 38 which may be distinguished as the operating drum. This is of proper size and proportion to the drum 24 to provide the requisite ratio of action. The drum 38 is mounted on an oscillatory stub shaft 38' supported in a bearing in the dashboard or instrument board 39 as shown in Figure 5.

The accessible end of the stub shaft carries an operating handle 40 which also functions as a pointer for co-operation with indicating symbols 41 on the indicating dial or plate 42 mounted on the instrument board within vision of the operator. This shaft 38' however extends into an enclosure 43 as shown in Figure 5, and at one end is surrounded by an expansion spring 44 which exerts pressure against a keeper disc 45. This disc is slidably mounted in the enclosure by way of lugs 46 extending through retaining slots 47 in the enclosure. The face of the disc is provided with keeper notches 48 which serve to selectively seat a retaining pin 49 on the stub shaft. The keeper seats 48 register with the symbols 41, the idea being to provide resilient retaining means for the pin 49 to hold the handle 40 in a set position.

The numeral 50 merely designates the current control switch for the aforesaid bulb 18.

The operation of the invention is substantially evident by considering the description in conjunction with the drawings. In fact, it is quite obvious that by catching hold of the pointer or handle 40 and oscillating the stub shaft 38 to the desired point, the drum 38 is actuated and through the instrumentality of the cable 36 the drum 24 is actuated. Manifestly, this rotates the tubular axle 20 as well as the printed transparent illuminated indicating cylinder 32. The principal point to bear in mind is the double-acting arrangement whereby the same signals (34 and 35) (Figure 4) are simultaneously visible through the sight openings 13 and 14, that is, from the front as well as from the back for automobile and pedestrian traffic.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

I claim:

1. A structure of the class described comprising a mounting tube having internal bearings, a slotted weather casing attached to one end of said tube and provided with diametrically opposed window-covered sight slots, a hollow axle mounted for rotation in said bearings and confined in said tubular mounting, a return spring surrounding said axle and attached at one end to one of the bearings and at its opposite end to the axle, a lamp socket attached to said axle and projecting centrally into said casing, a lamp mounted in said socket, a cylindrical open work cage attached to said socket and confined in said casing, a transparent sheet material cylinder surrounding the cage and embodying diametrically opposed indicating directions registrable with said slots.

2. A structure of the class described comprising a mounting tube having internal bearings, a slotted weather casing attached to one end of said tube and provided with diametrically opposed window-covered sight slots, a hollow axle mounted for rotation in said bearings and confined in said tubular mounting, a return spring surrounding said axle and attached at one end to one of the bearings and at its opposite end to the axle, a lamp socket attached to said axle and projecting centrally into said casing, a lamp mounted in said socket, a cylindrical open-work cage attached to said socket and confined in said casing, a transparent sheet material cylinder surrounding the cage and embodying diametrically opposed indicating directions registrable with said slots, said axle being of hollow construction to accommodate the electricity conductor for said lamp, a drum mounted on the axle and confined in said mounting, an operating cable for said drum.

3. A structure of the class described comprising a mounting tube having internal bearings, a slotted weather casing attached to one end of said tube and provided with diametrically opposed window-covered sight slots, a hollow axle mounted for rotation in said bearings and confined in said tubular mounting, a return spring surrounding said axle and attached at one end to one of the bearings and at its opposite end to the axle, a lamp socket attached to said axle and projecting centrally into said casing, a lamp mounted in said socket, a cylindrical open-work cage attached to said socket and confined in said casing, a transparent sheet material cylinder surrounding the cage and embodying diametrically opposed indicating directions registrable with said slots, said axle being of hollow construction to accommodate the electricity conductor for said lamp, a drum mounted on the axle and confined in said mounting, an operating cable for said drum, and remote control means for said cable comprising an enclosure, a stub shaft mounted for oscillation in said enclosure and provided with a drum to accommodate the opposite end of said cable, a retaining pin carried by said stub shaft, spring pressed keeper means for said pin, a dial associated with one end of the stub shaft, and a handle attached to the stub shaft and co-operable with said dial.

4. A structure of the class described comprising a mounting tube having internal bearings, a casing attached to one end of said tube and provided with diametrically opposed sight slots, an axle mounted for rotation in said bearings and projecting into said casing, a return spring surrounding said axle and secured at one end to one of said bearings and at its opposite end to said axle, a transparent tubular member carried by said axle for rotation therewith and arranged in said casing, said transparent tubular member embodying diametrically opposed indicating directions registrable with the slots in said casing, and means for illuminating said tubular member.

WASILY M. LESHKO.